United States Patent [19]
Schell et al.

[11] Patent Number: 5,420,976
[45] Date of Patent: May 30, 1995

[54] METHOD FOR SELECTING POSITION-DEPENDENT ACTIONS OF COMPUTER APPLICATIONS PROGRAMS

[75] Inventors: David J. Schell, Trophy Club; Lovie A. Melkus, Southlake, both of Tex.

[73] Assignee: International Business Machines Corp., Roanoke, Tex.

[21] Appl. No.: 975,069

[22] Filed: Nov. 12, 1992

[51] Int. Cl.$^6$ ............................................. G06F 17/20
[52] U.S. Cl. .................................... 395/159; 395/156; 345/146
[58] Field of Search ............... 395/156, 159, 146, 155, 395/161; 345/145, 146

[56] References Cited
U.S. PATENT DOCUMENTS

| | | | |
|---|---|---|---|
| 4,760,386 | 7/1988 | Heath et al. | 340/709 |
| 5,134,560 | 7/1992 | Ferriter et al. | 395/159 |
| 5,155,806 | 10/1992 | Hoeber et al. | 395/156 |
| 5,157,763 | 10/1992 | Peters et al. | 395/157 |
| 5,157,768 | 10/1992 | Hoeber et al. | 395/156 |
| 5,230,063 | 7/1993 | Hoeber et al. | 395/156 |
| 5,276,795 | 1/1994 | Hoeber et al. | 395/156 |

OTHER PUBLICATIONS

"Graph Plus", Micrografx (1988), pp. 2-1 to 2-17, 3-1 to 3-38, and 6-1 to 6-17.
"Microsof Windows Write User's Guide", Microsoft (1985), pp. 1-31.
"Functional Icon Pointers", Research Disclosure #30790 (Nov. 1989), p. 844.
Cowart, "Mastering Windows 3.1", SYBEX, Inc. (1993), pp. 264-275.
"Microsof Ships New Windows", San Jose Mercury News, Mar. 18, 1992, p. E1.

*Primary Examiner*—Heather R. Herndon
*Assistant Examiner*—N. Kenneth Burraston
*Attorney, Agent, or Firm*—John M. Cone; William L. Clayborn

[57] ABSTRACT

As user is allowed alternatives for selecting computer application program actions which are dependent on the position of a computer display cursor. If the cursor is located at the position where the action is desired, the computer's user selects a textual or symbolic description of the action, thereby causing the action to be performed at the cursor's position. If the cursor is not located at the desired position, user moves an icon associated with the desired action to the desired position, thereby moving the cursor and causing the action to be performed at the desired position.

3 Claims, 2 Drawing Sheets

METHOD FOR SELECTING POSITION-DEPENDENT ACTIONS OF COMPUTER APPLICATIONS PROGRAMS

BACKGROUND OF THE INVENTION

The present invention relates to applications programs for digital computers, and more specifically to an improved method for selecting actions in such programs which are dependent upon the position of a cursor on a computer display. It is to be understood that when a computer user selects an action, the program performs the selected action.

Many, if not most computer applications programs provide actions which are dependent on the position of a cursor on the computer's display. That is, when the action is selected by the computer user, the program performs the selected action at the display cursor's position. Usability studies have shown that computer users frequently forget to position the display cursor properly prior to selecting such position-dependent actions. When such an error is made, the user must correct the error, resulting in wasted time.

An example of a position-dependent action is the PASTE action provided in word processor programs. The PASTE action allows the computer user to move text within a document and to move text from one document to another. Other word processor examples of such actions are GET, FILL, WORD DELETE, LINE DELETE, INSERT LINE, and SPELL-CHECK.

To demonstrate the prior art method for selecting a position-dependent action, we will describe, with reference to FIG. 1 of the accompanying drawings, the manner in which the PASTE action is selected. This description assumes a word processor program which provides "pull-down" menus which display actions which may be performed by the program. This description also assumes that the computer is equipped with a conventional "mouse" with which the computer user may position a pointer.

FIG. 1 illustrates a computer display 1 with an example of a prior art word processor program menu. When the word processor program of this example is operating on the computer, a menu bar 3 is displayed at the top of the display 1. A typical prior art pull-down menu 5 may be displayed by selecting one of a number of menu items, FILE 7, EDIT 9, VIEW 11, OPTIONS 13, and HELP 15.

The pull-down menu 5 lists one-word descriptions of actions which the word processor program can perform: GET 17, PUT 19, CUT 21, COPY 23, and PASTE 25. Two of the listed descriptions, GET 17 and PASTE 25, are actions which depend on the position of the display cursor (not shown).

To move text from one position to another within a displayed document, the user must perform the following procedure:

1. Using the mouse pointer (not shown), the user designates the text to be moved. This is accomplished by placing the mouse pointer at the beginning of the text to be moved, depressing a button on the mouse, keeping the mouse button depressed while moving the pointer to the end of the text to be moved, then releasing the button.

2. To display the pull-down menu 5, the user places the mouse pointer on EDIT 9 and "clicks" (depresses and releases) the mouse button.

3. To delete the designated text from its original location and temporarily store it, the user selects the CUT action by placing the mouse pointer over CUT 21 and clicking the mouse button.

4. To select the PASTE action, the user places the mouse pointer on PASTE 25 and clicks the mouse button. The program then performs the PASTE action by inserting the designated text in the document at the position of the display cursor.

If the display cursor is not properly positioned when the user selects PASTE 25, the designated text will be inserted at an improper position, i.e., where the display cursor is located. To correct this error, the user must position the display cursor in the desired position, then repeat steps 1-4 above, thereby moving the designated text from the improper position to the proper position.

If the user notices that the display cursor is improperly positioned before selecting PASTE 25, the user may perform the following procedure:

1. Remove the menu 5 from the display 1 by clicking the mouse button.

2. Move the display cursor to the desired position.

3. Display the menu 5 by placing the mouse pointer on EDIT 9 and clicking the mouse button.

4. Select the PASTE action by placing the mouse pointer on PASTE 25 and clicking the mouse button.

Unfortunately, the display cursor may not be visible to the user, because, for example, it is positioned in a portion of the document which is not displayed on the display 1, or the pull-down menu 5 covers the position of the display cursor. In either case, the user will have to perform additional steps to verify that the cursor is correctly positioned.

It is an object of the present invention to provide alternatives for selecting position-dependent actions. A further object is to provide the user a visual cue which indicates that an action is a position-dependent action. A further object is to provide the user an additional visual cue that a menu contains a position-dependent action by repositioning the material on which the program is acting, if necessary, to make the position of the display cursor visible to the user when a menu containing a position-dependent action is displayed.

SUMMARY OF THE INVENTION

The present invention provides a method which allows the user alternatives for selecting a computer application program action which is dependent on the position of a display cursor. An application program menu contains a textual or symbolic description of the position-dependent action with a direct-manipulation icon adjacent thereto. If a computer display cursor is located at the point at which the computer user wishes the action to be performed, the user places a moveable pointer on the action's description and selects the action. Alternatively, if the display cursor is not located at the point at which the user wishes the action to be performed, the user places the moveable pointer on the direct-manipulation icon, moves the icon to the desired display position, and selects the action.

In addition to acting as a means for selecting the position-dependent action, the direct-manipulation icon acts as a visual cue to remind the user to verify the position of the display cursor before selecting the position-dependent action. To provide an additional visual cue to the user, when a menu containing a position-dependent action is displayed, the material on which the program is acting is repositioned, if necessary, to make the position of the display cursor visible to the user.

BRIEF DESCRIPTION OF THE DRAWINGS

An embodiment of the invention will be described, by way of example only, with reference to the accompanying drawings, in which.

DETAILED DESCRIPTION

As in the above description of the prior art, this description of the preferred embodiment of the present invention assumes a word processor program which provides pull-down menus which display actions which may be performed by the program. This description also assumes that the computer is equipped with a conventional mouse with which the computer user may position a pointer. It is to be understood that other embodiments of the invention are directed to applications programs which have other forms of menus and in which the pointer may be positioned by other means. Further, while the example of this description is related to a word processor program, it is to be understood that the present invention is applicable to any application program which provides one or more position-dependent actions.

Figure 1:
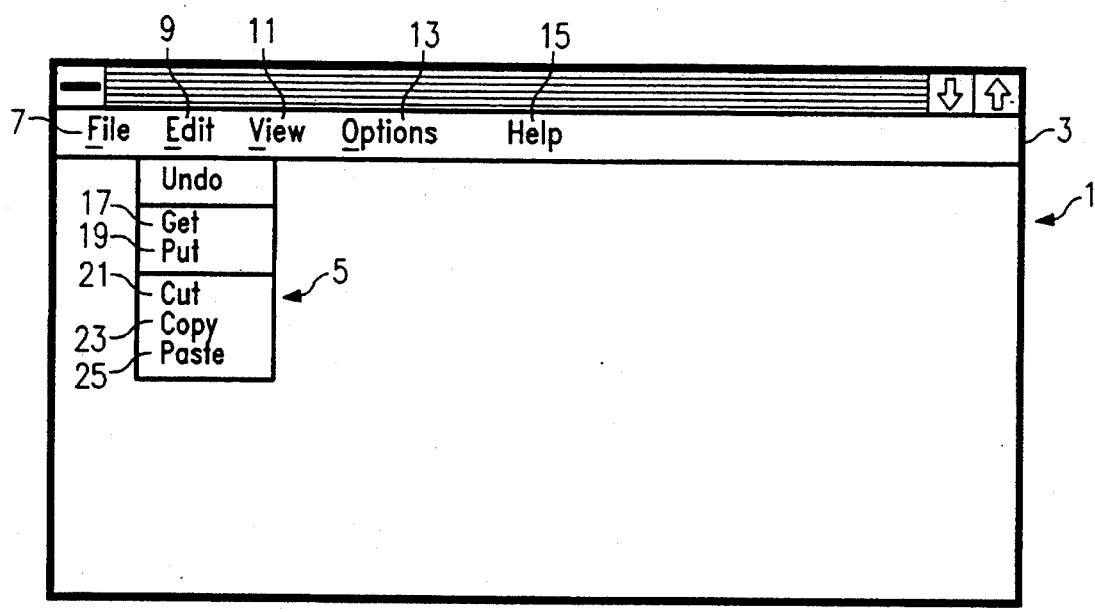
FIG. 1 is a computer display on which is displayed a prior art word processor program menu.
Figure 2:
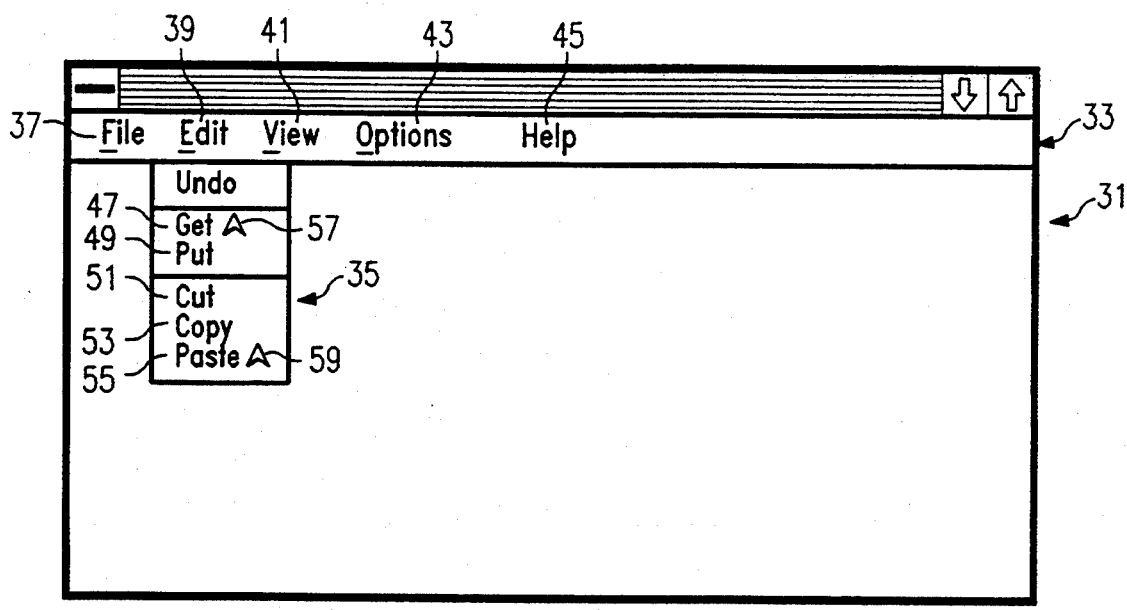
FIG. 2 is the computer display similar to that of FIG. 1, which shows a direct-manipulation icon adjacent to each position-dependent action listed on the menu.

As can be seen in FIG. 2, the display 31 in this embodiment of the present invention is substantially similar to the display 1 of the prior art word processor program shown in FIG. 1. The only difference between the displays 31 and 1 is that in FIG. 2 a direct-manipulation icon 57 and 59 is disposed adjacent to the position-dependent actions, GET 49 and PASTE 57. The remaining components of the displays 31 and 1 are identical in appearance and function.

To demonstrate the operation of the present invention, assume that the user wishes to perform the same task as that discussed above in relation to the prior art method for selecting a position-dependent action. That is, the user wishes to move text from one position to another within a displayed document. To do so, the user performs the following procedure:

1. Using the mouse pointer (not shown), the user designates the text to be moved. This is accomplished by placing the mouse pointer at the beginning of the text to be moved, depressing the mouse button, keeping the mouse button depressed while moving the pointer to the end of the text to be moved, then releasing the button.

2. To display the pull-down menu 35, the user places the mouse pointer on EDIT 39 and clicks the mouse button. When the menu 35 is displayed, the program repositions the material displayed on the display 31, if necessary, so that the display cursor may be seen by the user.

3. To delete the designated text from the original location and temporarily store it, the user selects the cut action by placing the mouse pointer over CUT 53 and clicking the mouse button.

4. The direct-manipulation icon 59 disposed adjacent to PASTE 55 provides the user a visual cue that the PASTE action is dependent on the position of the display cursor. Thus, the user is reminded to check the display cursor's position. Further, due to the action of the program in step 2, the display cursor can be seen by the user. This provides an additional visual cue to remind the user to check the display cursor's position.

5. If the user determines that the display cursor is in the desired position, the user selects the paste action by placing the mouse pointer on PASTE 55 and clicking the mouse button, which causes the program to insert the designated text at the position of the display cursor.

6. If the user determines that the display cursor is not in the desired position in the text, the user places the mouse pointer over the direct-manipulation icon 59 disposed adjacent to PASTE 55, depresses the mouse button, moves the icon 59 to the desired position in the text, and releases the mouse button. On release of the mouse button, the program moves the display cursor to the position of the icon 59 in the text, then inserts the designated text at the position of the display cursor.

Figure 3:
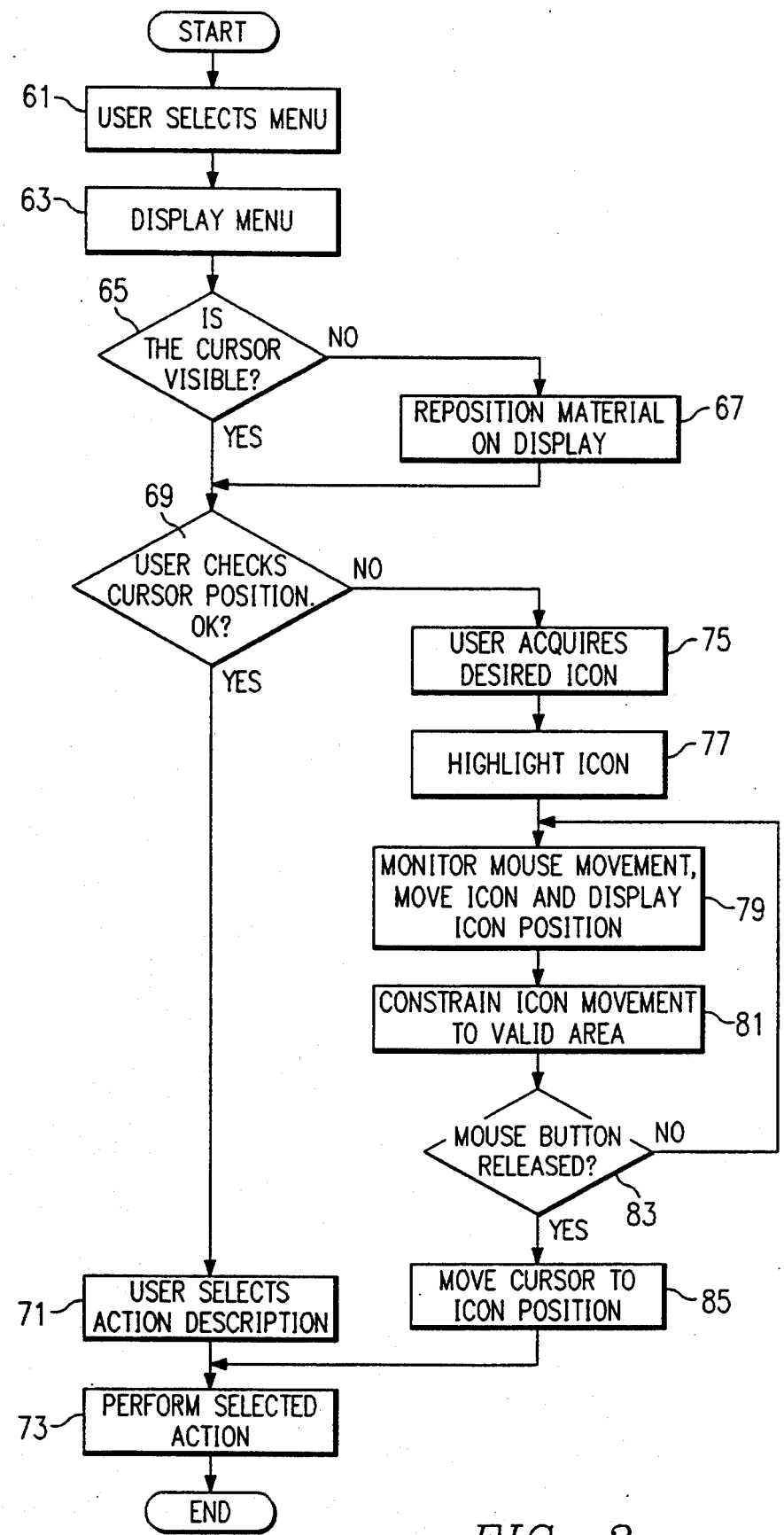
FIG. 3 is a flow diagram showing the operation of the present invention.

FIG. 3 is a block diagram showing the operation of this embodiment of the invention. It will be obvious to those skilled in this art that the method of the present invention may be implemented by making a modification to existing applications programs. Thus, the START and END blocks in FIG. 3 indicate the beginning and end respectively of the modification necessary to incorporate this embodiment of the invention into an existing program.

At block 61, the user selects the menu which contains the desired action. At block 63, the program displays the selected menu.

At block 65, the program determines if the display cursor is visible by the user. If the cursor is visible, the program proceeds to block 69. If not, at block 67 the program repositions on the screen the material on which the program is operating to make the display cursor visible to the user.

At block 69, the user inspects the computer display to determine whether the display cursor is located at the desired position. If the display cursor is in the desired position, the user selects the description of the desired action, block 71. At block 73, the program performs the selected action.

At block 75, if the user determines that the display cursor is not at the desired position at block 69, the user acquires the icon disposed adjacent to the description of the desired action. In this embodiment, acquisition is accomplished by pressing and holding the mouse button.

At block 77, the program highlights the acquired icon, indicating that the icon may be moved.

At blocks 79–83, the program monitors the user's movement of the mouse, moves the icon in accordance with the mouse movement, displays the icon's position on the display, and limits the icon's position to the area of the display that is visible by the user. The program continues to perform the foregoing until the user releases the mouse button, at which time the program proceeds to block 85.

At block 85, the program moves the display cursor to the position of the icon. The program then proceeds to block 73, where it performs the desired action at the position of the display cursor.

In an alternate embodiment of the invention (not shown), the program will not allow a position-dependent action to be selected in the conventional manner. That is, for a position-dependent action, the user must move the icon disposed adjacent to the desired action to the position at which the action is to be performed.

While the preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. A method for selecting position-dependent actions of computer applications programs, said method comprising the steps of:
   a. displaying a direct-manipulation icon adjacent to a textual or symbolic description of each position-dependent action;
   b. if a cursor on a computer display is at a position within displayed material at which said action is desired, allowing a computer user to place a moveable pointer on said description and to select said action, thereby causing said action to be performed at said cursor position; and
   c. if said cursor is not at a position within said material at which said action is desired, allowing the computer user to place said pointer on said icon and to move said icon to said desired position, thereby causing said action to be performed at said desired position.

2. The method of claim 1 wherein said description and said icon are displayed on a menu, which menu the computer user may cause to be displayed and cause not to be displayed.

3. The method of claim 2, further comprising the steps of:
   a. if necessary, automatically repositioning said displayed material to enable the computer user to observe said cursor; and
   b. if necessary, repositioning said displayed material to allow the computer user to move said icon to said desired position.

* * * * *